May 30, 1961 A. M. ALEXANDRESCU Re. 24,991

ROTARY TURBINE TYPE FLUID COUPLING

Original Filed Feb. 18, 1952 9 Sheets-Sheet 1

INVENTOR.
Alexander M. Alexandrescu
BY
Slough & Slough
ATTORNEY

ROTARY TURBINE TYPE FLUID COUPLING

Original Filed Feb. 18, 1952 9 Sheets-Sheet 2

INVENTOR.
Alexander M. Alexandrescu
BY
Slough & Slough
ATTORNEY

May 30, 1961 A. M. ALEXANDRESCU Re. 24,991

ROTARY TURBINE TYPE FLUID COUPLING

Original Filed Feb. 18, 1952 9 Sheets-Sheet 3

INVENTOR.
Alexander M. Alexandrescu
BY
Slough & Slough
ATTORNEY

May 30, 1961 A. M. ALEXANDRESCU Re. 24,991

ROTARY TURBINE TYPE FLUID COUPLING

Original Filed Feb. 18, 1952 9 Sheets-Sheet 4

INVENTOR.
Alexander M. Alexandrescu
BY
Slough & Slough
ATTORNEY

ROTARY TURBINE TYPE FLUID COUPLING

Original Filed Feb. 18, 1952 9 Sheets-Sheet 5

INVENTOR.
Alexander M. Alexandrescu
BY
Slough & Slough
ATTORNEY

ROTARY TURBINE TYPE FLUID COUPLING

Original Filed Feb. 18, 1952 9 Sheets-Sheet 6

INVENTOR.
Alexander M. Alexandrescu
BY
Slough & Slough
ATTORNEY

ROTARY TURBINE TYPE FLUID COUPLING

Original Filed Feb. 18, 1952 9 Sheets-Sheet 7

INVENTOR.

Alexander M. Alexandrescu

BY

Slough & Slough

ATTORNEYS

ROTARY TURBINE TYPE FLUID COUPLING

Original Filed Feb. 18, 1952 9 Sheets-Sheet 8

INVENTOR.
Alexander M. Alexandrescu
BY
Slough & Slough
ATTORNEY

ROTARY TURBINE TYPE FLUID COUPLING

Original Filed Feb. 18, 1952 9 Sheets-Sheet 9

INVENTOR.
Alexander M. Alexandrescu
BY
Slough & Slough
ATTORNEY

United States Patent Office

Re. 24,991
Reissued May 30, 1961

24,991

ROTARY TURBINE TYPE FLUID COUPLING

Alexander M. Alexandrescu, 549 E. 114th St., Cleveland 8, Ohio

Original No. 2,720,952, dated Oct. 18, 1955, Ser. No. 272,030, Feb. 18, 1952. Application for reissue Oct. 10, 1957, Ser. No. 689,462

30 Claims. (Cl. 192—3.2)

Matter enclosed in heavy brackets [ ] appears in the original patent but forms no part of this reissue specification; matter printed in italics indicates the additions made by reissue.

The present invention relates generally to improvements in automatic fluid driving control systems for automotive vehicles and the like, and more particularly to fluid coupling devices such as the mechanisms disclosed in my United States Patent No. 2,569,087, "Rotary Turbine Type Fluid Coupling," issued September 25, 1951, and my co-pending United States patent applications, Serial No. 122,236, filed October 19, 1949, now abandoned, "Fluid Coupling with Cupped Blades," Serial No. 136,896, filed January 5, 1950, now abandoned, for "Fluid Coupling with Advanced Blades," and Serial No. D. 16,585 filed September 8, 1951, now abandoned, for "Automatic Rotary Fluid Projecting Device."

An object of the present invention is the provision of a fluid coupling device having over the full range of operation improved torque transmisison characteristics with respect to the torque transmission efficiency and to the smoothness of torque communication.

A further object is the provision of an improved fluid coupling which is simple in construction, low cost in the materials and operations of manufacture and of compact, rugged structure.

Further objects and advantages of the invention will appear in the following description and the drawings of this invention wherein—

Figure 1:
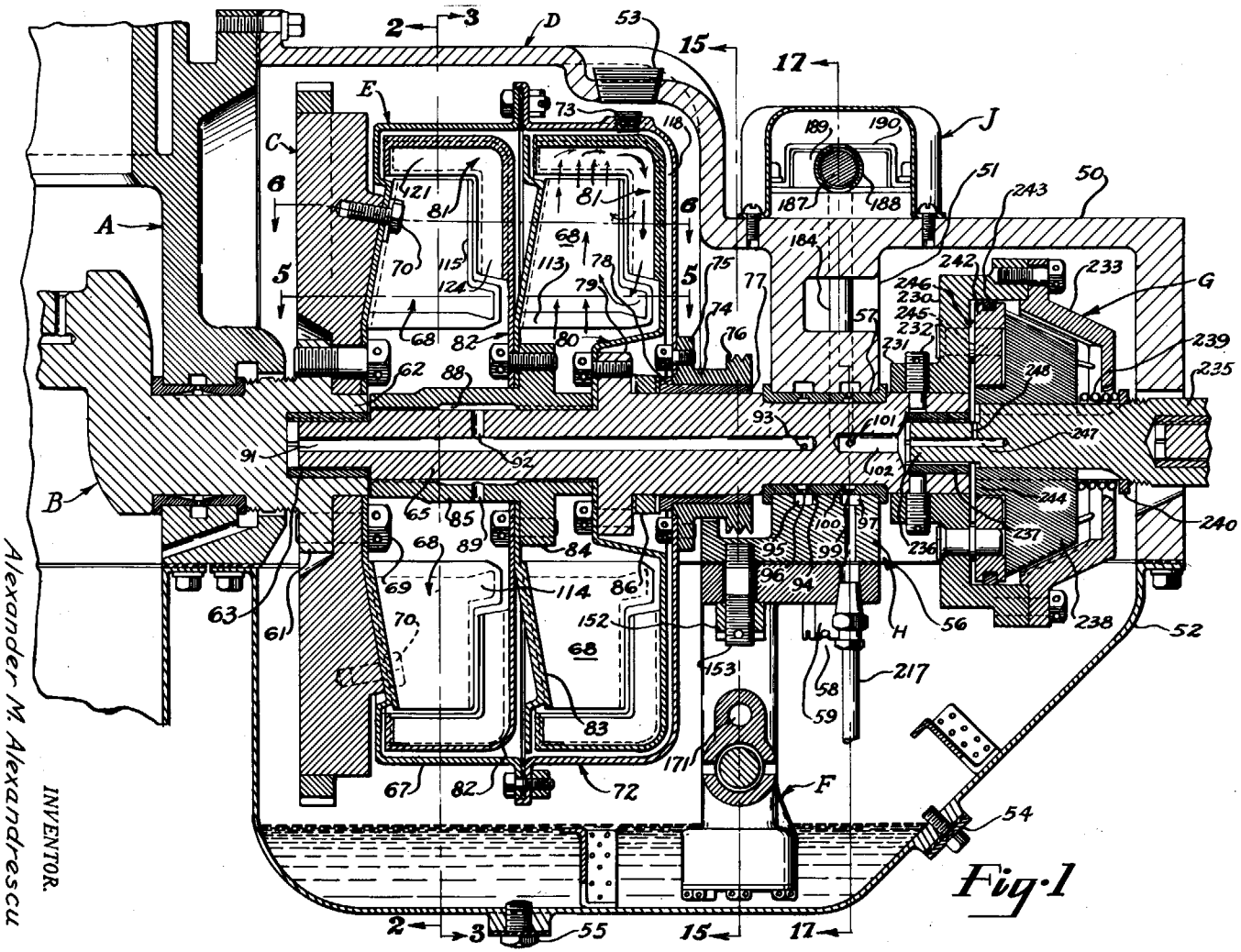
Fig. 1 is a longitudinal vertical section of this invention taken through the axis of rotation along the lines 1—1 of Fig. 2 showing a two-stage fluid coupling unit, with an associated automatic driving control unit and a hydraulically actuated safety clutch.
Figure 25:
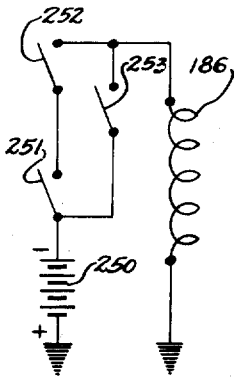
Figure 15:
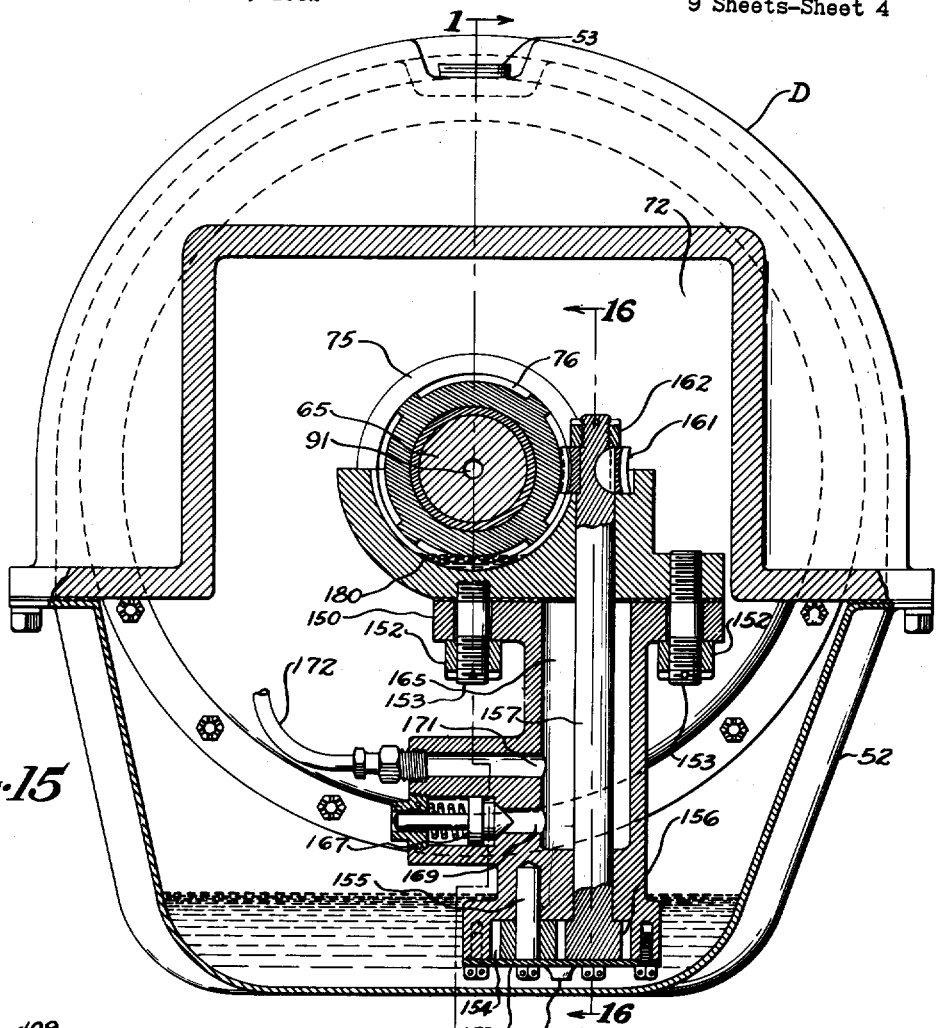
Figure 6:
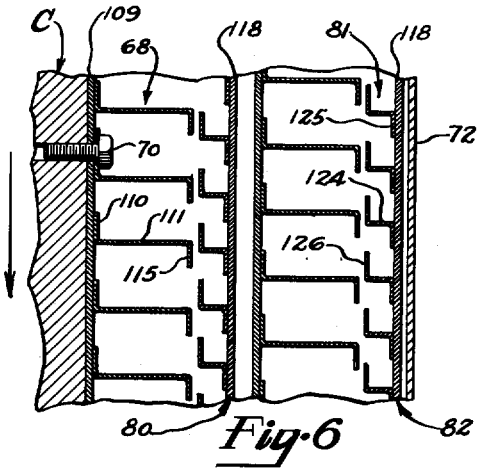
Fig. 6 is a fragmentary section view of the fluid coupling unit taken circumferentially at 6—6 in Fig. 1 to show the shape of the fluid impeller blades and fluid return channels of the turbine blades at a locus radially outward from that of Fig. 5.
Figure 7:
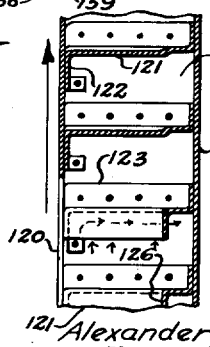
Fig. 7 is a fragmentary sectional view taken along the staggered section line 7—7 of Fig. 4 to show the form of the outer end structure of the turbine blades.
Figure 9:
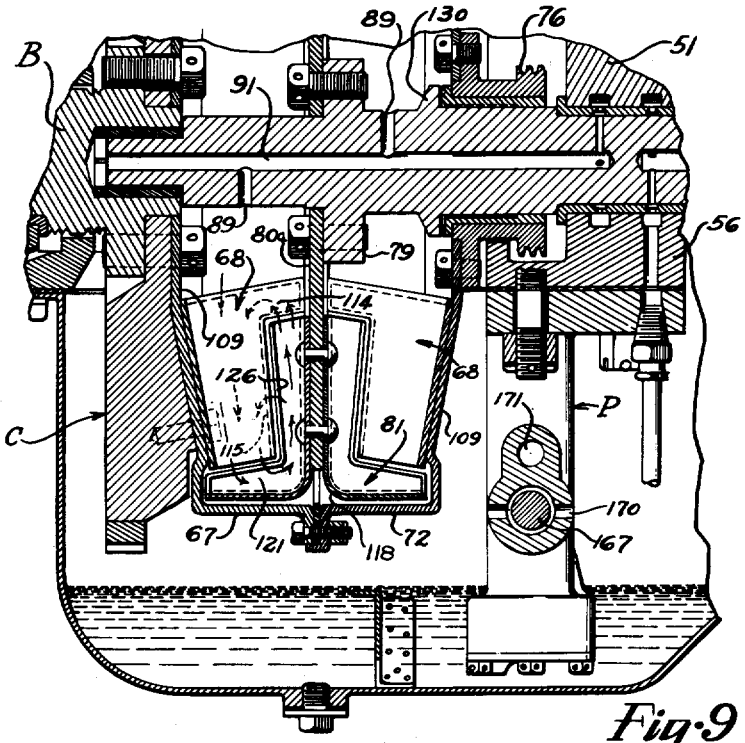
Fig. 9 is a fragmentary sectional view taken similarly to Fig. 1 but showing a second form of impeller and turbine blades arranged in dual parallel acting sets as a single stage drive.
Figure 10:
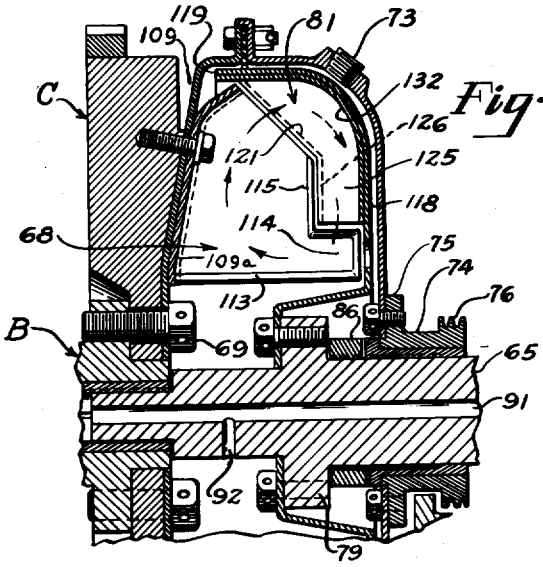
Fig. 10 is similar to Fig. 8 but has a third modification of the blade forms.
Figure 11:
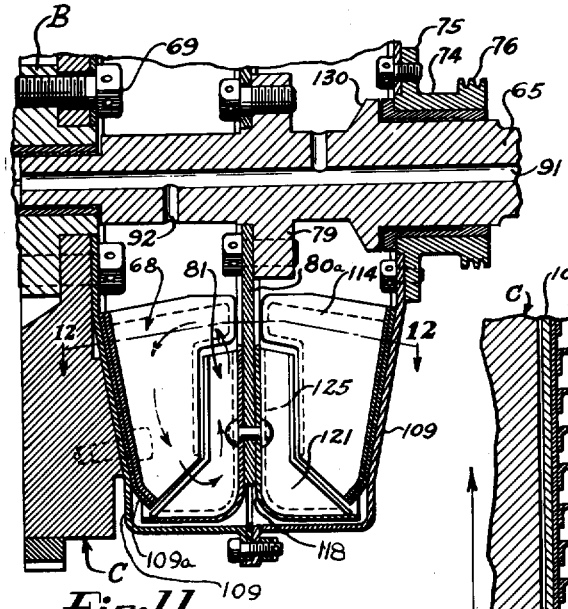
Figure 14:
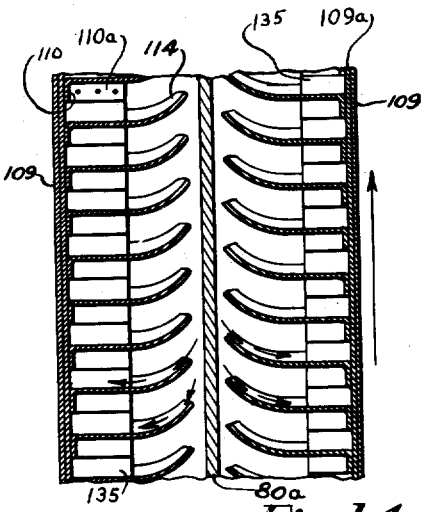
Figure 12:
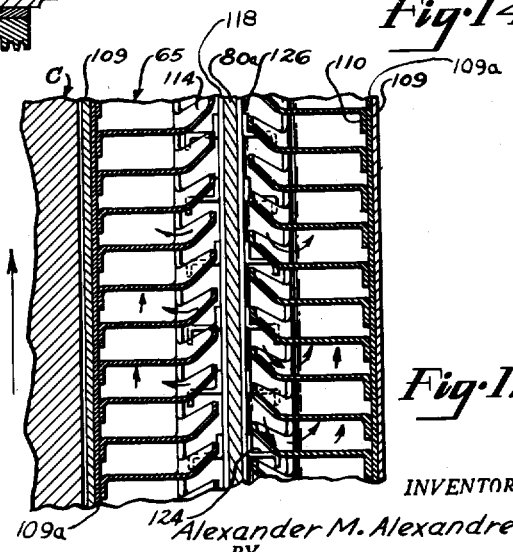
Figure 23:
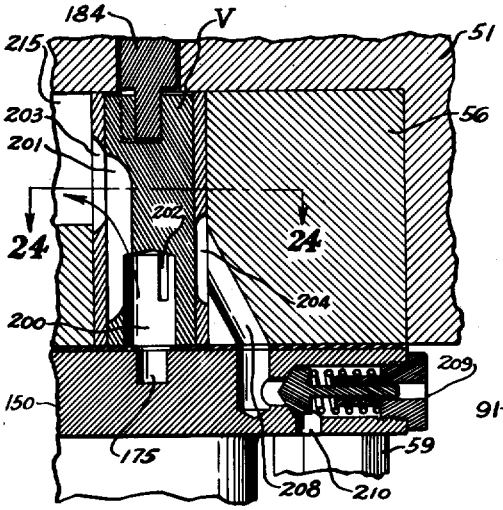
Figure 13:
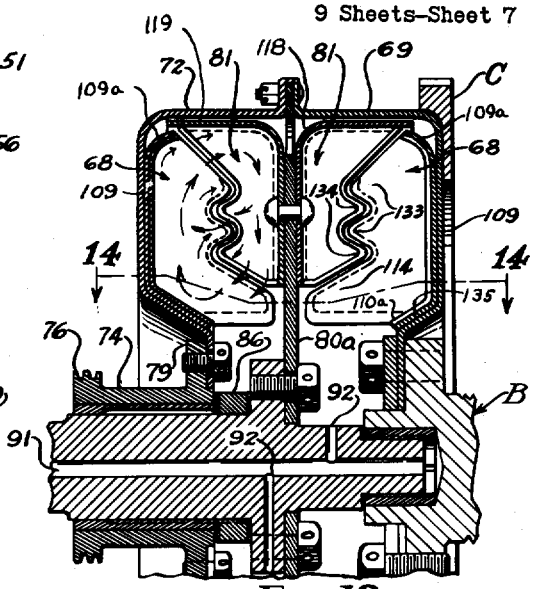
Figure 22:
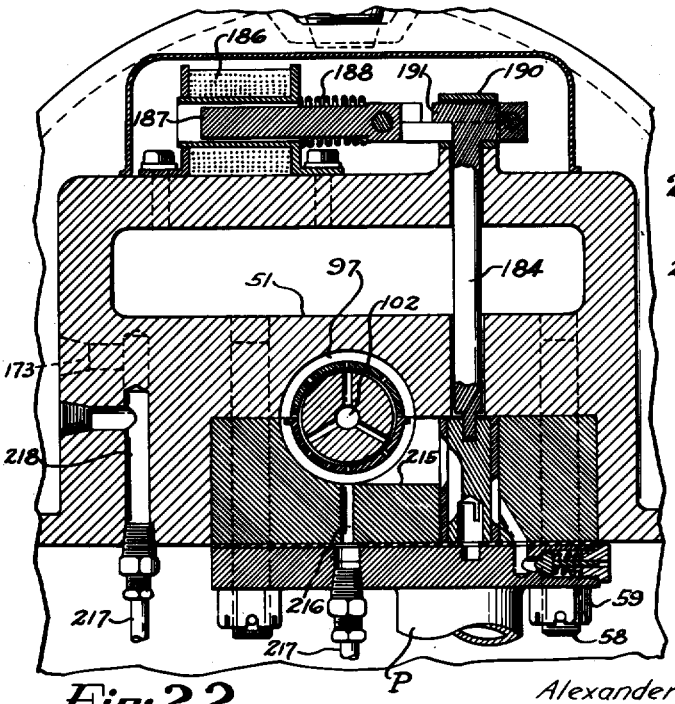
Figure 24:
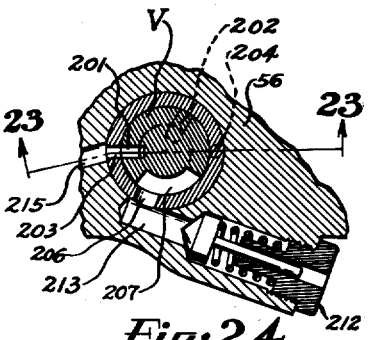
Figure 16:
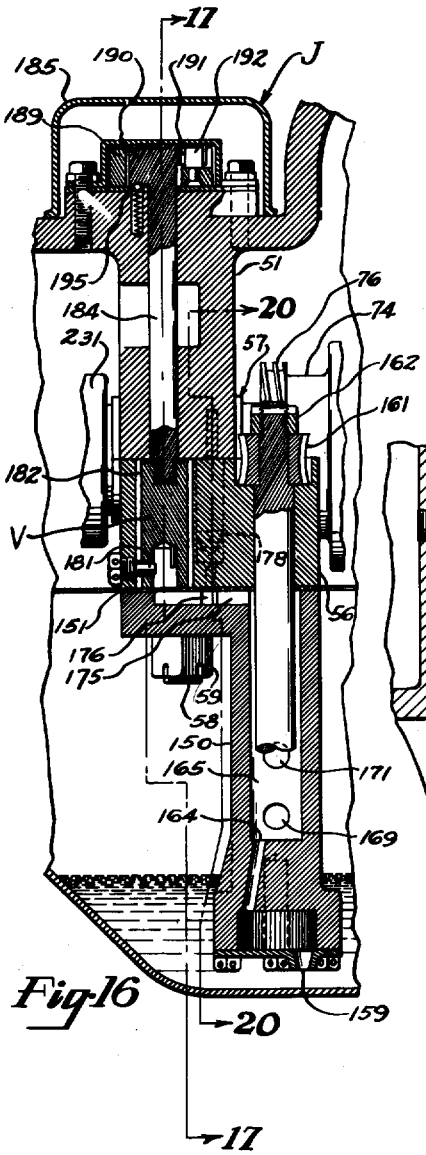
Figure 20:
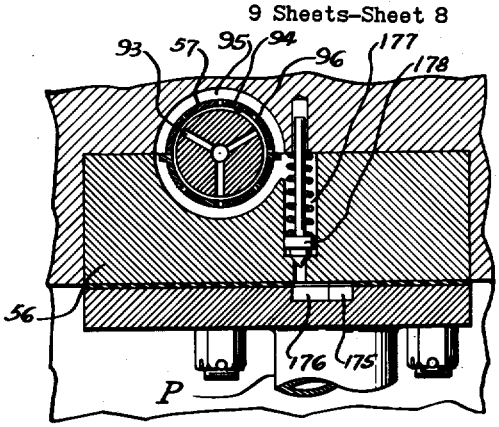
Figure 21:
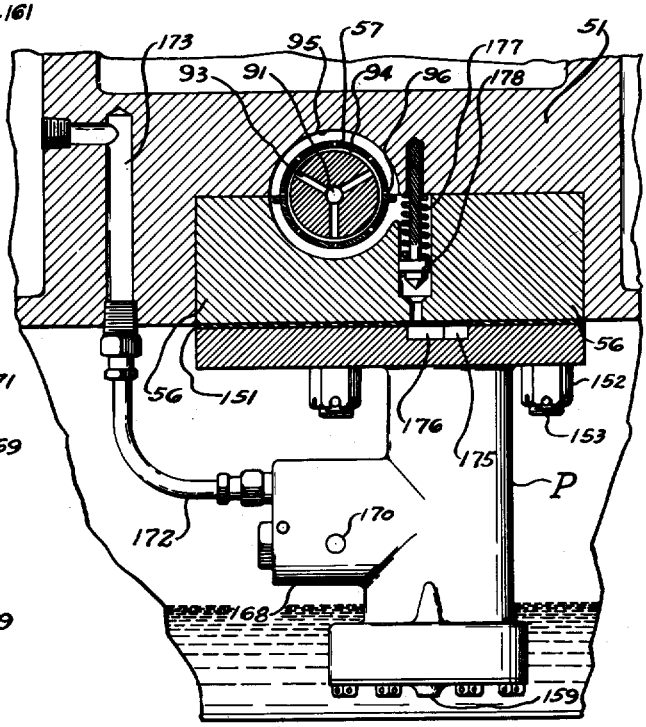
Figure 17:
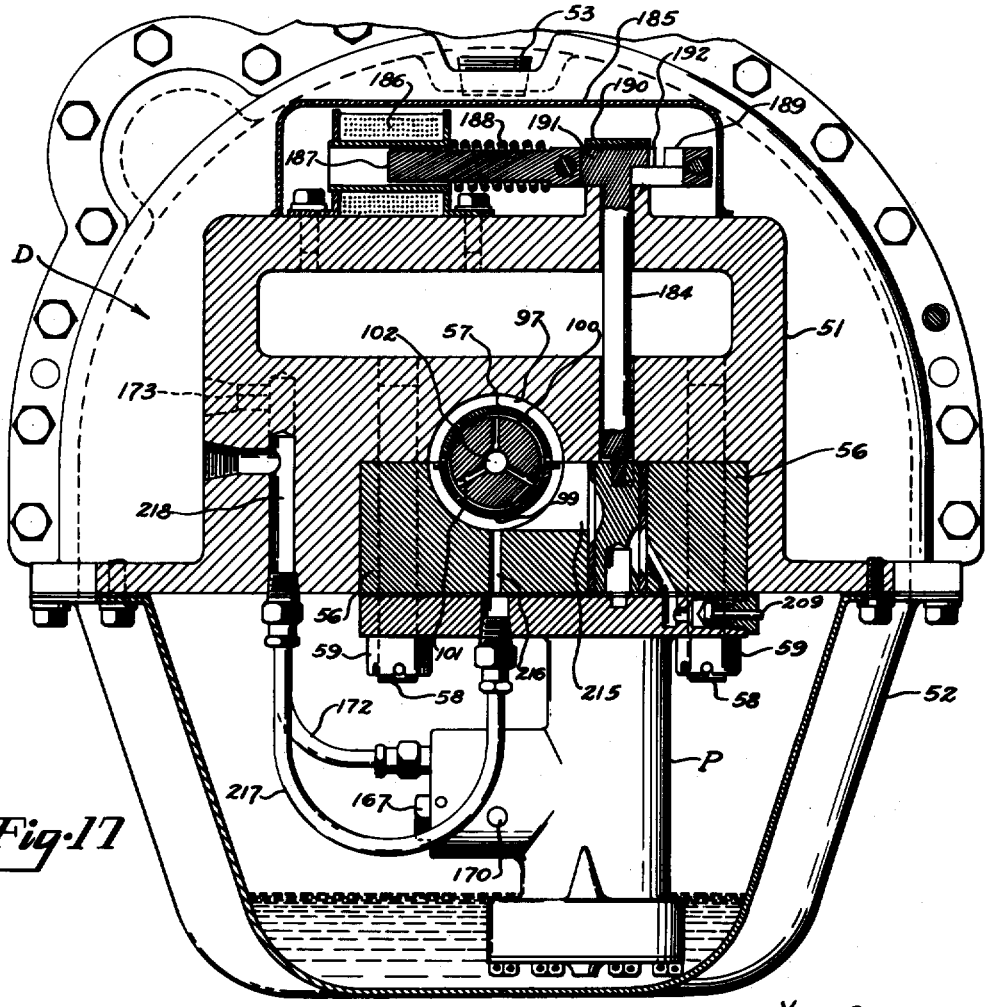
Figure 18:
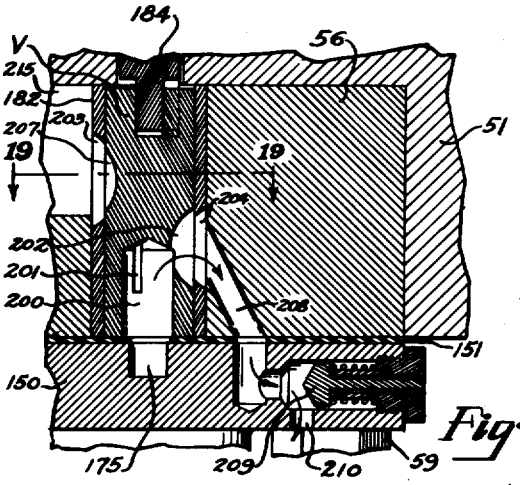
Figure 19:
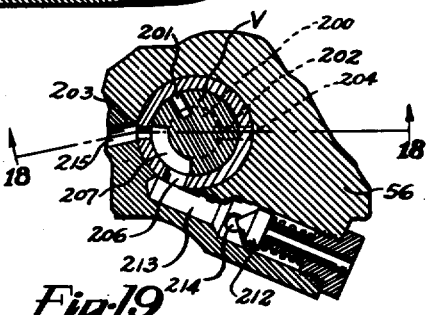

Fig. 11, similar to Fig. 9 discloses a single stage fluid coupling with a form of turbine blades generally similar to those of Fig. 10, but arranged in double sets;

Fig. 12 is a fragmentary section taken along the line 12—12 of Fig. 11;

Fig. 13 is a fragmentary longitudinal section of a single stage fluid coupling unit having a fourth form of blades arranged in parallel sets, the view being taken vertically through the axis of rotation;

Fig. 14 is a fragmentary sectional view taken circumferentially along the line 14—14 of Fig. 13;

Fig. 15 is a transverse section of Fig. 1 taken along the line 15—15 of Fig. 1 to show a vertical section of the hydraulic fluid pressure pump;

Fig. 16 is a fragmentary section taken through the pump and automatic driving control unit along the line 16—16 in Fig. 15;

Fig. 17 is a transverse section of the automatic drive control unit, taken along the line 17—17 in Figs. 1 or 16 showing the control valve solenoid in unenergized position and the corresponding position of the automatic driving control valve;

Fig. 18 is a detail of Fig. 17 showing the arrangement of the automatic driving control valve and an associated relief valve in the pump base;

Fig. 19 is a fragmentary section taken horizontally along 19—19 in Fig. 18 through the automatic driving control valve and the adjacent relief valve in the bearing pillow block;

Fig. 20 is a vertical transverse section taken between the pump and automatic driving control unit along line 20—20 in Fig. 16 to show the structure of the fluid drive pressure control valve and fluid feed channels from the pump, the valve being closed;

Fig. 21 is similar to Fig. 20 but shows the valve open;

Fig. 22 is similar to Fig. 17 showing the control valve solenoid energized and the corresponding position of the automatic driving control valve;

Fig. 23 is a detail of Fig. 22;

Fig. 24 is a fragmentary horizontal section corresponding to Fig. 19 but showing the automatic driving control valve position of Fig. 22; and Fig. 25 is an electrical control circuit for operating the automatic driving control valve.

Though the present invention is adapted to other environments, in the drawings and this specification, for the sake of convenience, it is shown and described as applied to an automobile. Thus in Fig. 1, A represents the rear part of an auto engine block, B the crankshaft of the engine and C the fly-wheel provided with the usual starter ring gear. A housing D attached to the rear of the engine block encloses a fluid coupling unit E, a fluid pump F, a hydraulically actuated clutch G and an automatic driving control unit H for which a solenoidal actuating unit J is mounted exteriorly of the housing. The housing D comprises an upper portion 50 with a transverse web 51, and a lower fluid pan 52 gasketed and bolted thereto to serve as a sump for oil or other suitable hydraulic fluid. In the housing D suitably filling, inspection and drainage plugs 53, 54, and 55 are provided.

The web 51 and pillow block 56, mounting the split shell type bearing 57, and the base of pump F are held together by studs 58 and nuts 59. The rear end of the crankshaft B is provided with a fly-wheel mounting flange 61 and a reduced portion 62 extended through the flywheel and bored coaxially to receive a sleeve or pilot bearing 63 having interior longitudinal lubricating channels. The main shaft 65, with the reduced portions at the forward end and toward the rear journalled in bearings 63 and 57 respectively, mounts the outer member or casing of the clutch G at its rear end beyond the web 51 as is hereinafter described. The fluid coupling unit E comprises a two stage series drive system, each stage including a set of fluid impeller and turbine blades, with the turbine of the first stage driving the impeller blades of the second. As shown in Fig. 1, the casing of the unit E comprises two halves bolted together along flanges, with a gasket interposed to form a liquid-tight joint. The forward half 67 of the casing, to the conically dished end wall 109 of which the fluid impeller blades 68 of the first stage are brazed, welded or riveted, is secured to the fly-wheel by cap screws 69 passed through the fly-wheel into the crankshaft end flange 61 and by cap screws 70 threaded into the fly-wheel. The rear half 72 of the casing, provided with a filling plug 73 alignable with the housing plug 53 for initially filling the casing, is rotatably mounted on the main shaft 65 through the medium of the bushing 74 having a flange portion 75 to which the casing half is bolted and a worm 76 cut thereon for driving the pump F as hereinafter described. On the sleeve bearing 77, pressed into bushing 74, there is an end flange 78 extended into the casing, and from this flange lubricating grooves are cut partly down the length of the bearing surface. To a flange 79 of the main shaft 65 is bolted the turbine wheel 80 carrying turbine blades 81 of the second stage. Between the fluid impeller wheel of the first stage and the turbine wheel 80 of the second stage there is interposed the first stage turbine wheel 82 and second stage fluid impeller wheel 83 commonly secured back-to-back to the flange 84 on the sleeve shaft 85 rotatably mounted on the main shaft. Between the flange 79 and the end flange 78 on the bearing 77 there is provided a thrust bearing and spacer ring 86 radially grooved on each bearing face for lubrication purposes.

In the sleeve shaft 85, from an inner circumferential groove 88 lubrication grooves are cut lengthwise to the ends of the sleeve shaft and radial apertures 89 open from groove 88 through the shaft wall. A central channel 91, bored in the main shaft from the forward end and extending part-way into the length of the reduced portion within bearing 57, opens through the radial apertures 92 and 93 respectively to the sleeve shaft groove 88 and to the circumferential groove 94 in the bearing surface of bearing 57. A channel 95 cut in web 51 and pillow block 56 communicates through bearing apertures 96 with a groove 94. These channels associated with groove 94 are best seen in Fig. 17. In a similar manner as clearly appears from Fig. 20 a second circumferential channel 97 in the web and pillow block about the bushing 57 opens through the radial bearing apertures 99 to a circumferential groove 100 in bearing 57 and thence through the radial channels 101 in the main shaft to a second central bore 102 opening into the clutch sleeve or pilot bearing recess at the clutch end of the main shaft 65. By means of these several shaft and bearing passages fluid supplied under pressure from pump F to the channels 95 and 97, in a manner hereinafter described, may be delivered to the fluid drive unit, to the clutch mechanism, and to the bearings for forced lubrication.

As the fluid impeller blades and turbine blades of one stage are identical to those of the other they are designated by like numerals and will be described by reference to either stage as shown in Figs. 1–7. The fluid impeller blades 68 in this form of the invention have outer edges and radial edges at right angles to each other and in close working proximity to the correspondingly shaped adjacent edges of the turbine blades 81 as may be seen in Fig. 1, the blades projecting axially, i.e., in a direction substantially parallel to the axis of rotation, from the surfaces on which mounted. Each impeller blade 68 is secured, as by spot welding, along its flange 110 to a disk portion 109 of the fluid impeller, the end wall of the casing member 67 providing the disk in the first stage. The body of each blade 68, as appears in Figs. 1, 2, 3 and 5, comprises a substantially radially disposed section 111 merging into an outer portion 112 curved forwardly to terminate in the outer free edge thereof (i.e. in the direction of rotation), an inner edge provided with a lip 113 folded forwardly about 45°, a laterally projecting fluid shifting vane portion 114 bent forwardly at 45° to the blade body and extending under the bottom of the fluid return 124 of the turbine blades, and a forwardly folded lateral edge 115 radially outward of the vane portion 114. The vane portion 114 is cupped by folding its edges forwardly, thus providing a continuous edge fold along the lateral free edge of the blade body around the vane portion and across the inner edge 113, which serves to reinforce each blade so that relatively thin sheet metal may be used for the blade stock. Important operational functions of the edge folds will be later described.

Each turbine wheel 80, 82 comprises a disk 118 with a circumferential flange 119, a plurality of blades 81 preferably exceeding slightly by an even number the blades of the corresponding impeller, to effect a smoother power transmission, and a flat ring 120 extending inwardly of the end of flange 119 to close the end space between adjacent buckets. The form and disposition of the turbine blades can be clearly seen from Figs. 1, 4, 6 and 7. Each turbine blade comprises a rearwardly open curved bucket 121 secured by end flange 122 and longitudinal flange 123 respectively to ring 120 and circumferential flange 119, and a radially extended fluid return portion 124 secured to disk 118 by flange 125, the outer end of the fluid return opening into the end of the bucket. The length of the bucket portion of the turbine blades is somewhat greater than the breadth of the impeller blades, so that the ring 120 lies outside the impeller blades. Hence the end wall 109 is recessed annularly to accommodate and clear the rim of the turbine wheel. Similarly to the impeller blades, each fluid return portion has a lateral or radial edge 126 folded at 90° to the body of the blade, but opposite to the direction of rotation, to form a radial continuation of the rear edge of bucket 121, so that corresponding edge portions on impeller and turbine blades are folded in mutually opposite directions. Spot welding, brazing or riveting may of course be used to affix the turbine blades. As in the case of the impeller blades, the several flange, edge fold and curved formations of the turbine blades confer structural strength permitting manufacture from light sheet stock by stamping, pressing or drawing operations. Since the casing members 67—72 and the impeller and turbine wheel disks may likewise be formed from sheet metal of suitable gage by stamping, pressing or drawing operations, the structure described is adapted to low cost mass production of a simple, compact, sturdy and efficient fluid coupling unit.

By the blade structures described, a channel for radial outward flow of hydraulic fluid is provided between the impeller blades 68 directing the fluid forwardly into the turbine buckets 121 with a slight lateral component toward the return channel 125 due to the dished form of the disks 109. At idling speed the forward impeller blade curvature is effective to minimize drag between impeller and turbine elements. Between the blades 81 in turn there is a channel for radial return flow. Also by the provision of the folded lateral edge 115 on the impeller blade, fluid tending to escape in an axial direction from between adjacent turbine blades is intercepted by a passing impeller blade. The slanted fluid shifting vane 114 at the bottom of the impeller blade picks up fluid leaving the bottom of turbine return channel 124 for a quick return into the impeller system, while with the lateral edge 126 partially enclosing the radial space between the turbine blades, fluid projected into the buckets is returned and [direced] *directed* more effectively against the face of vane portion 114. These several structural features of the blades contribute to more effective fluid coupling at high speeds, and a smooth torque application at all times.

Due to the double fluid coupling interposed between engine and main shaft 65, very smooth pickup is obtained in a vehicle provided with the two stage coupling unit of Fig. 1–7 while drag between driving and driven elements is minimized. Hence this type of unit is particularly useful in conjunction with high speed engines.

Figure 8:
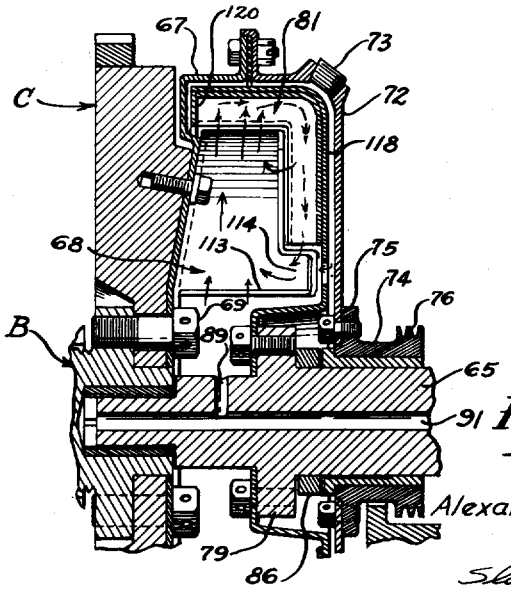
Fig. 8 is a fragmentary sectional view taken similarly to Fig. 1 showing a single stage fluid coupling unit having impeller and turbine blades similar to those of Figs. 1–7.

Other blade forms and arrangements of a single stage type are shown in Figs. 8–14 wherein elements similar to those of Fig. 1–7 are designated like numerals. Fig. 8 discloses a form of fluid drive unit with blade forms similar to those of Figs. 1–7 wherein a single stage drive is used comprising but one impeller and turbine wheel, each with a single set of blades. As the sleeve shaft 85, shown in Figs. 1 and 2, and the structures auxiliary thereto are unnecessary and hence omitted, the casing and shaft are shortened and modified accordingly. Such a unit has high coupling efficiency but is adapted rather to use with slower type engines.

Figure 2:
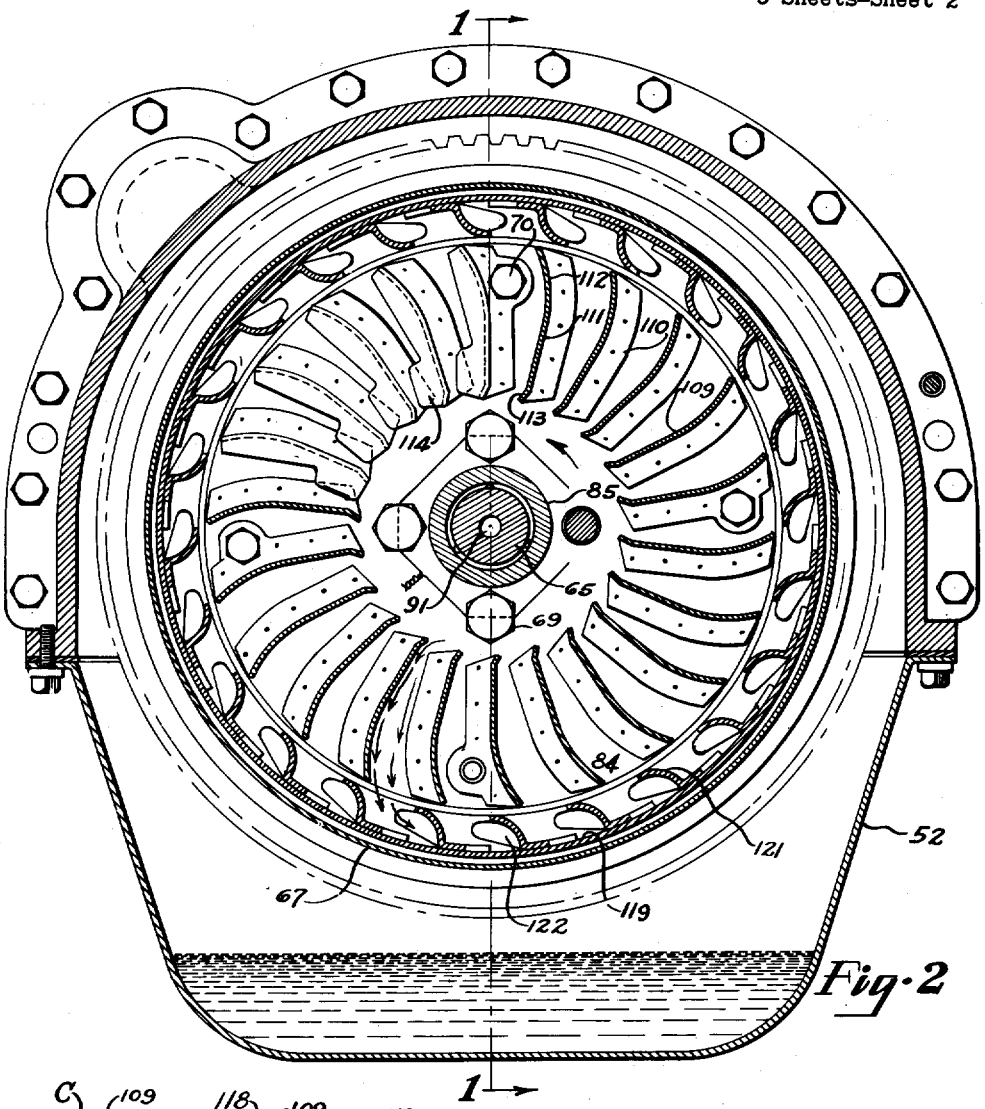
Fig. 2 is a vertical section taken through the fluid coupling unit transverse to the axis of rotation along the line 2—2 of Fig. 1 and showing the form of the fluid impeller and turbine blades.
Figure 5:
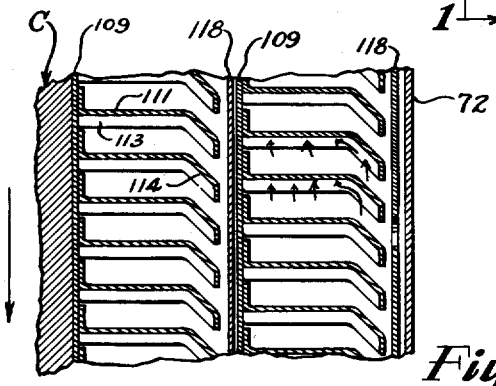
Fig. 5 is a fragmentary sectional view of the fluid coupling unit taken circumferentially at the line 5—5 in Fig. 1 to show the form and disposition of the inner ends of the fluid impeller blades.
Figure 3:
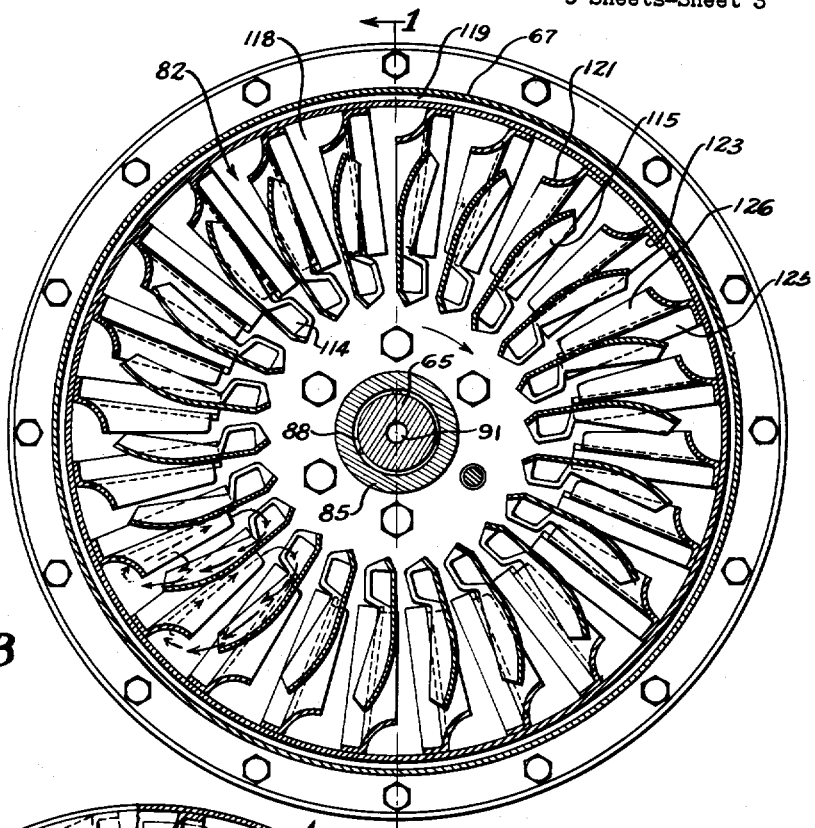
Fig. 3 is a vertical cross sectional view taken through the fluid coupling device transverse to the axis at the same position as Fig. 2 but looking to the rear of the device.
Figure 4:
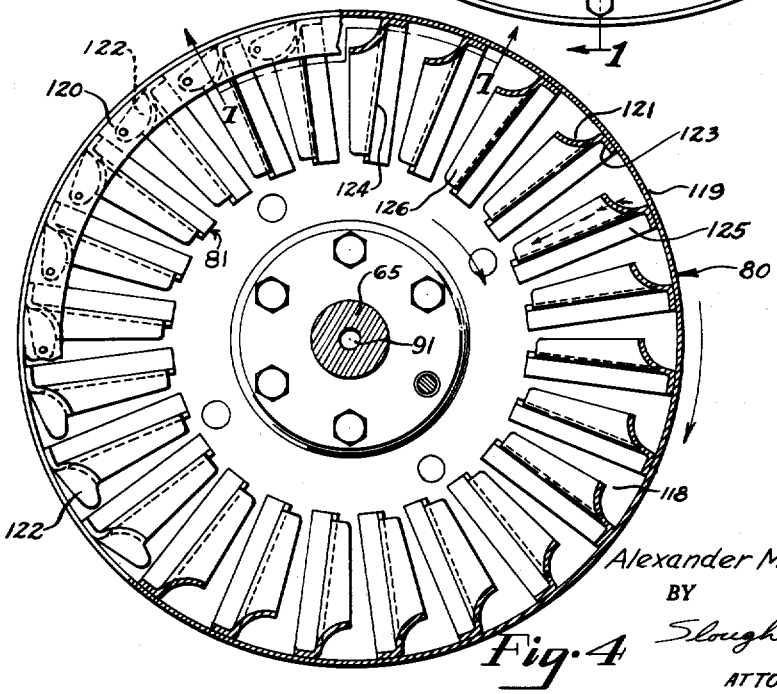
Fig. 4 is a view from the front of the second stage turbine wheel, certain parts being broken away to show the form of the turbine buckets and radial fluid return channels of the turbine wheel.

In Fig. 9 there is disclosed a single stage unit wherein impeller blades and turbine blades of individual form generally similar to those of Figs. 1 and 2 are used. However, two sets of impeller blades 68 are arranged on the end disks 109 of the two halves of the casing, while the two sets of turbine blades 81 are arranged on flanged rings 118 secured to opposite sides of a heavy disk 80a bolted to flange 79 on the main shaft for rotation between the two sets of impeller blades. The flanged rings 118 are shaped similarly to the blade mounting portion of turbine disks 118 of Figs. 1–8. The main shaft 65 is changed in form from that of Figs. 1 and 2 by the omission of structural features rendered unnecessary by the lack of the sleeve shaft, and by the addition of the thrust flange 130 bearing against the end flange 78 of bearing 77. In this case the lateral folded edges of the turbine and impeller blades 126 and 115 are inclined relative to the axis of rotation, whereby the outward flow in the impeller blades is directed into the turbine buckets with a lateral component somewhat greater than in the previous forms.

Since here there are in effect two fluid couplings acting in parallel between engine and shaft 65, this arrangement is adapted to heavy duty service where large torque demands are encountered, especially with slow speed engines such as diesels. By the opposed paired disposition of the turbine blade sets, reactive forces developed on opposite sides of the turbine wheel unit counterbalance each other to prevent undue axial stresses and attendant wear. Similarly the fluid forces acting on the casing are balanced.

In the coupling units of Figs. 10–14, the impeller and turbine blade forms, as compared to those previously described, develop a greater lateral component in the projected fluid flow, due to the fact that in addition to the forward curvature shown in Figs. 1–9, the outer ends of the impeller blades have a laterally directed curvature to direct the flow into the turbine buckets at 45° to plane of rotation. Such blade forms develop a smoother vehicle pickup than would normally be obtained by the blade forms of Figs. 1–9 in a single stage coupling when used with high speed engines. Because of the lateral curvature of the impeller blades, they are secured to an annular disk the outer portion of which is curved correspondingly, the disk in turn being bolted to the casing end wall.

In the single stage coupling shown in Fig. 10, the disposition of the fluid return portion 124 of the turbine blades and the fluid shifting vane portion 114 on the impeller blades is similar to those of Figs. 1–8. However, the outer ends of the impeller blades in addition to being curved forwardly in the direction of rotation, are shaped to deflect the flow from a generally radial direction into the turbine bucket 121 at an angle of about 45° to the axis of rotation and the impeller blades are mounted on a correspondingly curved ring 109a bolted to the casing end wall. The turbine wheel disk 118 is joined to circumferential flange 119 by a corner 132 of large radius as compared to previous forms, and the turbine blades are correspondingly modified at the bucket portion 123 which extends obliquely to the axis of rotation across the corner 132 from flange 119 to fluid return 125 at an angle of 45° to flange 119 to accommodate the shape of the impeller blades.

In Fig. 11 is shown a single stage drive provided with a dual system of turbine and impeller blades mounted similarly to Fig. 9, the form of the individual blades, however, being substantially that of Fig. 10. The disposition and form of the fluid shifting vane portions 114 and turbine blade fluid return portions 125 is quite similar to that of the form of Figs. 1–7 as shown by the fragmentary circumferential section in Fig. 12. The blade form of this device suits it to use with high speed engines, while the dual arrangement in single stage coupling, with axial reaction force components counterbalanced as in the structure of Fig. 9, adapts it to heavy duty service.

In Fig. 13 still another form of blades is shown arranged in a dual system of turbine and impeller blades mounted in a single stage drive for heavy duty service as in Figs. 9 and 11. The outer ends of the impeller blades 68 in this case deflect the outward flow of fluid from a radial direction at an angle to the axis into the turbine buckets 123 in a manner similar to the blades of Figs. 10 and 11. The adjacent surfaces of the turbine and impeller blades between the fluid shifting vane portions 114 and the outer ends of the impeller blades are complementarily shaped to project inwardly with respect to each other by virtue of the sinuous edge formations 133, 134. These formations 133—134, serving as minor shifting vane portions intercepting fluid in the interblade channels, also induce additional fluid reaction forces which results in a more efficient fluid coupling particularly at low relative speeds between impeller and turbine wheels, or under heavy loads. The blades here are folded on edges corresponding to the folded edges of the previous blade forms. Fig. 14, a circumferential section of Fig. 13, clearly shows the curved form of the fluid shifting vane portions. Here the impeller blade mounting ring 109a is flanged at 135 partway about the inner ends of the blades as well as the outer ends, and the radial attachment flange 110 of each impeller blade is continued by the angularly disposed flange portion 110a to provide additional support for the inner end of the impeller blade.

The structure of hydraulic fluid pump F, which maintains hydraulic fluid under a few pounds pressure in the fluid coupling unit in addition to other functions, is best seen in Figs. 15 and 16, the latter figure also showing clearly the relation of pump to automatic driving control unit H. The pillow block 56, which also forms part of the automatic driving control and serves to mount the pump structure, projects beyond the transverse web 56 toward the fluid drive unit. The pump base 150 is sealed to the bottom of the pillow block 56 by a gasket 151 and held by nuts 152 on studs 153, with the pump extending downwardly toward the bottom of the fluid pan with its lower end below the normal sump liquid level. A gear pump mechanism comprising the gear 154 revolvable on the stub shaft 155 and gear 156 cut on the lower end of pump drive shaft 157, is enclosed in a cavity in the lower end of the pump body by pump cover 158 through which intake port 159 opens to the sump. The pump drive shaft 157, journalled near its lower end in the pump body and near the upper end in the pillow block, is driven by the worm 76 on bushing 74 through gear 161 keyed to the upper end of the pump shaft and held thereon by means of nut 162.

Fluid taken in to the gear pump through the intake port 159 in the pump cover is delivered through outlet port 164 to the fluid reservoir 165 provided by the longitudinal cavity surrounding the pump shaft. A pressure relief valve 167 mounted in the lateral projection 168 on the pump casing and opening to the reservoir by the passage 169 allows the pump to discharge fluid to the fluid pan through the vents 170 when the pressure exceeds, say 25–30 p.s.i. A second passage 171 in projection 168 opening to the pump reservoir is connected by conduit 172 to the fluid channel 173 in the transverse web as shown in Fig. 21 for purposes hereinafter described. Hydraulic fluid is delivered from the top of the fluid reservoir 165 through a distributing channel 175 to the bottom of automatic fluid driving control valve member V, and through lateral channel 176 opening upward through the channel 177, to the circumferential groove 95 about the main shaft bearing 57 for supplying fluid to the fluid drive unit. As shown in Figs. 20 and 21, in the channel 177 there is a spring biased pressure regulating valve 178 limiting the pressure in fluid drive unit E and retaining fluid in the passageways and fluid coupling unit. The spring bias of valve 178 is chosen (relative to the pressure limit of pump relief valve 167) to limit the pressure in the fluid coupling unit to about 5 p.s.i. when the pump is operating. The portion of the pillow block 56 projecting beyond web 51 is provided with a semi-circular trough 180 extending partway around and underneath the worm 76 on the bushing 77. The worm 76 dips into a body of hydraulic fluid which leaks between shaft 65 and bearings 57 and 77 or between the pump shaft and casing into trough 180, thereby providing continuous lubrication for the pump shaft gearing.

The automatic driving control unit H, illustrated in Figs. 16–24, comprises the cylindrical valve member V rotatable in a valve sleeve 182 held in set position in the pillow block 56 by the set screw 181 and the actuating unit J includes a solenoidal powered mechanism for rotating the valve shaft 184 journalled in the web 56 and having its lower end provided with a tongue engaged in a transverse slot of the valve member V. A pin or set screw 181 engaging an arcuate slot in valve member V, retains the valve member in axial position. The solenoid actuating unit J situated on top of the housing D and enclosed by the casing 185 comprises the solenoid 186, an armature 187 biased by spring 188 away from the solenoid and provided with a yoke 189, sliding in guide 190, disposed about the flanged head 191 of the actuating shaft and having a pin 192 engaging a radial slot 193 in the flange of the shaft head. Thus as the solenoid is energized, the armature draws the yoke inwardly against the bias of the spring, thereby rotating the valve member from one position to another. To position the valve actuating shaft more exactly in the two extreme positions, a spring biased detent ball 195, engageable with two detent formations on the under-side of the shaft head, is provided in the housing.

As shown in Figs. 17, 18 and 19 wherein the solenoid and valve member V are in off position, the channel 175 from the pump reservoir opens to a central bore 200 extending partway up the valve member V. Two longitudinally extending slots 201, 202 are cut into the valve member to meet the central bore 200 and are alignable respectively with the slots 203, 204 through the sleeve 182. The valve member V is also provided at the height of sleeve slots 203, 206 with a circumferentially extended groove 297 of peripheral length sufficient to span the slots 203, 206 when rotated to "on" position by the energized solenoid. From sleeve slot 204 a passage 208 runs through the pillow block to relief valve 209 in the pump base 150 which discharges through vent 210 to the fluid pan. Sleeve slot 206 likewise opens through a relief valve 212 in pillow block 56 in channel 213 discharging through the opening 214 to the fluid pan. Valves 209 and 212 are both lightly loaded to open readily under pressure but to close off the exhaust lines against static drainage and entrance of air. From sleeve slot 203 a passage 215 runs to the circumferential groove 97 about bearing 57 and to a channel 216 through the pillow block and pump casing connected by the conduit 217 to the passage 128 opening laterally through the web member 53.

Thus with the valve member V in the position shown in Figs. 17 to 19, for the unenergized condition of the solenoid (when the engine is idling), fluid delivered by the pump through the channel 175 to the central bore 200 of the valve member V passes through slots 202, 204 and channel 208 to the valve 209 which opens to discharge to the fluid pan, thereby serving as a bypass valve from the pump to the sump, while at the same time fluid may exhaust from the circumferential groove 97 and passage 216 through channel 215 and slot 203 which is open (Fig. 19) through valve member groove 207 to the light relief valve 212. Valve 212 readily opens for discharge of fluid through vent 214, but closes at near zero pressure to exclude air from the passages.

When the solenoid is in energized position as shown in Figs. 22–24, the valve member is rotated to a position such that the longitudinal slot 201 in the valve member is brought into alignment with the channel 203 through the valve sleeve to allow delivery of fluid under pressure from the pump through the central bore 200 through channel 215 to the circumferential channel 97 for actuation of the clutch and to passage 216 for actuating a control valve of a hydraulic shifting mechanism. With the valve in this position, the passages to the relief valves 209 and 212 are closed.

The hydraulic clutch unit G shown in Fig. 1 includes a casing comprised of a cylindrical half 230, the hub portion 231 of which is secured to the end of the main shaft 65 by the set screws 232 projecting into radial apertures of the shaft, and a conical portion 233 bolted to the cylindrical portion along the circumferential flanges. A clutch output shaft 235, having a reduced end 236 journalled in the sleeve bearing 237 in the end of the main shaft, carries a conical inner clutch member 238 splined thereto to allow axial movement for engaging the conical surface of the casing. The inner member 238 is biased toward disengaged position by the helical compression spring 239 interposed between the end of the inner clutch member and the thrust washer 240 seated on a shaft 235. The outer end of shaft 235 is journalled in an automatic shift unit (not shown). Within the cylindrical part of the clutch casing an annular hydraulic piston member 242 provided with a piston ring or packing 243 is disposed about the hub 244 of the inner clutch member on guide pins 245, extending parallel to the axis of rotation from the end wall of the outer casing and provided with stop rings or flanges 246 to space the piston from the end wall when in the extreme position. The central bore 247 in the clutch shaft which opens to the bottom of the bearing recess and so to bore 102 of the main shaft, is provided with radial apertures 248 opening into the space between the annular piston and the casing. Thus fluid supplied under pressure to the circumferential groove 97 about the bearing 57 upon actuation of valve V by the solenoid passes through the channels previously described in bearing 57, main shaft 65 and the clutch shaft 235 into the space behind the piston 242 to move the inner clutch member 238 axially into engagement with the conical portion of the clutch casing. When the solenoid is de-energized, thus setting valve V to allow fluid to exhaust from groove 97, the clutch can move into disengaged position under bias of spring 239, while fluid from the automatic fluid shift cylinders can return through 172 to the pump reservoir, since the pump is running at idling speed, to exhaust through channel 176 to valve 209.

In Fig. 25 there is shown the wiring diagram for an electrical circuit controlling the solenoid 186 of the hydraulic valve actuating unit. This circuit includes the battery 250, the switches 251, 252 and the solenoid 186 in serial relation, the switch 253 providing a jumper around the first two switches. The switch 251 is linked with a manually positioned shift control lever to close when the lever is moved from a neutral to a forward or reverse position, and the switch 252 is mechanically linked to the engine accelerator pedal to close upon acceleration, so that the solenoid is energized only when the shift control lever is set for forward or reverse operation and the accelerator is depresesd. However, the switch 253 is manually operable in case of emergency (e.g. failure of switch 251 or 252) or during descent of hills, or other occasion requiring engine braking, to energize the solenoid and so to set the entire mechanism in driving relation to utilize the engine braking action.

When the engine is to be started, the shift lever is set to a neutral position, thereby opening switch 251 so that the solenoid remains unenergized and hence the valve V remains in closed position. Thus the clutch will remain disengaged during the starting operation. After the engine has been started the clutch remains disengaged until such time as both switches 251 and 252 are closed by setting the shifting control lever to an operating position and by depression of the accelerator pedal. When the shift lever is set to a desired operating position, thereby closing switch 251 and the accelerator is depressed, closing switch 252, the solenoid is energized to set the valve member V to its open position as shown in Figs. 22–24. With the acceleration of the engine and the fly-wheel with attached impeller blades, fluid is centrifugally projected into the turbine buckets developing torque which is applied to the main shaft. At the same time fluid supplied under pressure by the pump builds up pressure in the fluid drive unit to increase the efficiency of coupling and also supplies power to hydraulic shift cylinders of the automatic shifting mechanism. Also, fluid is supplied through the open automatic driving control valve to the fluid shift mechanism control valve to actuate the shifting mechanism and also to cause the clutch to move into engaged position. Thus the torque is transmitted from the engine to the driving wheels of the vehicle. With the acceleration of the impeller in the fluid drive unit the fluid is projected outwardly by the centrifugal force through the impeller blades into the buckets of the turbine wheel to effect a high degree of torque multiplication. As the turbine wheel picks up speed so that the relative slip between turbine and impeller is decreased, the torque gradually diminishes until the turbine is rotating at its maximum speed for the given load conditions. Thus the fluid coupling unit serves as a fluid transmission in starting of the vehicle and in climbing hills or overcoming other running loads.

When the accelerator is released, opening switch 252 and thereby de-energizing the solenoid 186, the spring biased armature 187 moves outwardly, rotating the actuating shaft 184 and connected valve member V into closed position as shown in Figs. 18 and 19. This cuts off the fluid supply channel 175 from the channel 215 and opens the channel 175 to the exhaust valve 209 to return the fluid to the sump. With the pump discharge by-passed through valve 209 to the sump, fluid pressure is no longer maintained to the valve 178 in the conduit to the fluid coupling casing. In consequence, the pressure with the casing drops immediately with the leakage of a very slight amount of the hydraulic fluid permitted between bushing 74 and shaft 65, and with the pressure drop the coupling effect decreases thereby conducing to the elimination of drag between driving and driven elements at idling speeds. This result is of utility when the clutch G is not used in conjunction with couplings of the type disclosed.

Since channel 215 is now switched by valve member V to the lightly loaded relief valve 212, the pressure in the automatic channel system and the automatic shift control line is immediately released allowing the clutch to disengage and the automatic shift valve to move into inactive position, the displaced fluid discharging through valve 212 to the fluid pan. The valve 212 then closes to keeps the channels filled with hydraulic fluid and to prevent access of air to the fluid passage.

*In the form of my invention shown in Figs. 1–8 inclusive, by virtue of the interpositioning of the first turbine and the second impeller between the first impeller secured to the fly wheel and a second turbine secured to the main shaft, and the mounting of said first turbine and said second impeller upon a sleeve shaft rotatably mounted upon said main shaft, a smoother pick up is ensured by reason of successive and progressive transmission of power from the engine through the fluid coupling unit E to the transmission.*

*The essential operation of my invention in this form results from driving one stage of the fluid coupling through the fly-wheel and main shaft and the other stage through the medium of a sleeve shaft.*

I claim:

1. A rotary fluid coupling comprising a casing mounted for rotation by a prime mover; a driven shaft co-axial to said casing; means mounting said shaft to said casing for rotation relative thereto; a fluid impeller element including a plurality of axially extended impeller blades carried by an end wall of said casing, a turbine element within said casing including a disk portion carried by said driven shaft, an annular rim flange extending from said disk portion in radially spaced relation to the ends of said impeller blades and a plurality of turbine blades extending axially from said disk, each turbine blade having a bucket portion secured to said rim flange and a fluid return portion secured to said disk portion extending generally radially from said bucket, said bucket portion having a free edge thereof directed rearwardly relative to the direction of rotation; each said impeller blade having outer and lateral free edge portions shaped complementarily to adjacent turbine blade portions and including a generally radially extending body, a fluid shifting vane portion extending forwardly and laterally from the inner end portion of said body at a position radially inward of the inner end of the fluid return portion of said turbine blades, and a forwardly turned edge fold formed along the inner end of said body, around said vane portion and along the lateral free edge of the body outward of said vane portion.

2. A rotary fluid coupling comprising a casing mounted for rotation by a motor; a driven shaft co-axial to said casing; means mounting said shaft to said casing for rotation relative thereto; a fluid impeller element including a plurality of impeller blades carried by an end wall within said casing; a turbine element within said casing including a disc portion carried by said driven shaft, an annular rim flange extending from said disc portion in radially spaced relation to and beyond the ends of said impeller blades and a plurality of turbine blades extending axially from said disc, each turbine blade having a bucket portion secured to said rim flange and a fluid return portion secured to said disc portion extending generally radially from said bucket, said bucket portion having a free edge thereof and said fluid return portion having lateral free edge thereof turned rearwardly relative to the direction of rotation; each said impeller blade being shaped complementarily to adjacent turbine blade portions and including a body having the outward portion thereof curved forwardly relative to the direction of rotation to direct fluid into said turbine buckets, a fluid shifting vane portion extending forwardly and laterally from the inner end portion of said body at a position radially inward of the inner end of the fluid return portion of said turbine blades, and a forwardly turned edge fold formed along the inner end of said body, around said vane portion and along the lateral free edge of the body outward of said vane portion.

3. A rotary fluid coupling as described in claim 2 wherein the impeller and turbine blades are provided with sinuous interfitting adjacent free edge portions.

4. A rotary fluid coupling as described in claim 2 wherein the bucket portions of said turbine blades are disposed obliquely to the axis of rotation and the outer ends of the fluid impeller blades are curved laterally to direct fluid into said bucket portions.

5. A rotary fluid coupling as described in claim 2 including a second fluid impeller element carried by the casing end wall opposite to the first said casing end wall and a corresponding second turbine element carried by said driven shaft.

6. A rotary fluid coupling as described in claim 2 wherein said driven shaft comprises a sleeve shaft and said means mounting said driven shaft to said casing comprises a second driven shaft extending through and rotatable relative to said sleeve shaft and journal means mounting the second shaft to the casing for rotation relative thereto, said coupling including a second fluid impeller element carried by the first said driven shaft and a second turbine element corresponding thereto carried by said second driven shaft, whereby the second shaft is indirectly driven by the first said driven shaft.

7. A rotary fluid coupling comprising a fluid impeller element, a turbine element driven by fluid from said impeller element, a casing inclosing said elements; said impeller element having a generally radially extending body portion and a plurality of blades extending axially from and disposed generally radially on said body portion, each said impeller blade having a fluid shifting vane portion extending laterally and forwardly in the direction of rotation from the inner end portion thereof, an outer portion curved forwardly in the direction of rotation and a forwardly turned flange extending inward to said vane portion, said flange being continuous with a forward edge fold formed along the edges of said vane portion and along the inner end of the impeller blade; and said turbine element having a generally radially extending body portion, a peripheral flange on said body portion extending towards the impeller element in radially spaced relation to and enclosing the ends of said impeller blades, and a plurality of turbine blades each having a rearwardly open bucket portion on said peripheral flange and a fluid return portion on the turbine element body portion extending radially inward from said bucket portion towards said vane portions, the free edge of said bucket portion and the lateral free edge of said return portion on said turbine blade being turned rearwardly to form a continuous channel whereby fluid projected into said bucket portion is returned radially inwardly to the locus of said vane portions.

8. In combination a rotary fluid coupling as described in claim 2, a fixed housing for enclosing said casing, said housing providing a sump for hydraulic fluid, a hydraulic fluid pump mounted within said housing to draw fluid from said sump, means providing a driving gear connection between said casing and said pump, conduit means from the outlet of said pump opening to the interior of said coupling through the said driven shaft thereof, and pressure limiting valve means in said conduit to limit the pressure within the casing of said coupling, said casing being provided with means adjacent to the center of an end wall allowing controlled leakage of fluid under pressure, by-pass valve means connecting the outlet of said pump to said sump, solenoidal valve actuating means to close said bypass valve means, said actuating means being biased to move said bypass valve to a normally open position when the solenoid thereof is unenergized, a solenoid energizing circuit, motor speed control means, and a solenoid control switch in said circuit linked to and operable by said control means to closed position upon setting of the control means for acceleration of the motor above a selected idling speed, whereby said pump discharge is by-passed to the sump when the motor controller is set to idle speed condition.

9. A rotary fluid coupling unit comprising a casing enclosing a fluid working space for a body of hydraulic fluid, said casing being mounted for rotation by a prime mover; a set of fluid impeller blades carried by an end wall of said casing and extending axially therefrom; a driven shaft extending through said casing; journal means mounting said shaft to said casing for rotation relative thereto; a turbine wheel within said casing secured to said driven shaft including a substantially radial disc portion and an annular rim flange thereon extending towards said end wall outside the ends of said impeller blades, and a set of turbine blades secured to said flange and said disc portion with the free edges thereof in close rotational proximity to the adjacent impeller blades, said impeller blades each including a substantially radially extending body, a vane portion extending forwardly in the direction of rotation and laterally from the inner end of said body beyond the inner ends of said turbine blades, and a forwardly turned flange formed along the free edge of said impeller blade body outward of said vane portion; a forwardly directed edge fold formed on the inner edge of said body portion and on the edge of said vane portion merging into said forwardly turned flange; and said turbine blades each including a bucket portion secured within said rim flange having an inner edge turned oppositely to the direction of rotation and a fluid return portion extending radially inward from said bucket portion, said fluid return portion having an edge flange joined to the turned inner edge of said bucket to provide a channel to conduct fluid radially inward from said bucket.

10. A rotary fluid coupling unit comprising a casing enclosing a fluid working space for a body of hydraulic fluid, said casing being mounted for rotation by a prime mover; a set of fluid impeller blades carried by an end wall of said casing and extending axially therefrom; a driven shaft extending through said casing; journal means mounting said shaft to said casing for rotation relative thereto; a turbine wheel within said casing secured to said driven shaft including a substantially radial disc portion and an annular rim flange thereon extending towards said end wall outside the ends of said impeller blades, and a set of turbine blades secured to said flange and said disc portion with the free edges thereof in close rotational proximity to the adajcent impeller blades; said impeller blades each including a substantially radially extending body with the outer portion thereof curved forwardly in the direction of rotation; a vane portion extending forwardly in the direction of rotation and laterally from the inner end of said body beyond the inner ends of said turbine blades, and a forwardly turned flange formed along the free edge of said impeller blade body outward of said vane portion; a forwardly directed edge fold formed on the inner edge of said body portion and on the edges of said vane portion merging into said forwardly turned flange, and said turbine blades each including a bucket portion secured within said rim flange having an inner edge turned oppositely to the direction of rotation and a fluid return portion extending radially inward from said bucket portion, said fluid return portion having an edge flange joined to the turned inner edge of said bucket to provide a channel to conduct fluid radially inward from said bucket.

11. A rotary fluid coupling comprising a rotary fluid impeller element; a turbine element driven through hydraulic fluid by said impeller element; and a casing enclosing said elements; said impeller element comprising a generally radially extending body portion and a plurality of impeller blades extending axially from and disposed generally radially on said body portion; each said impeller blade being formed of sheet metal and having a blade body, an edge flange formed lengthwise on the blade body for attachment of the blade to said impeller body portion, a fluid shifting vane portion extending laterally and forwardly in the direction of rotation from the inner end of the blade body, a second edge flange formed at a right angle to the blade body and extending outwardly from said vane portion, said flange being directed forwardly relative to the direction of rotation, and a forwardly directed edge fold formed on the inner edge of the blade body and on the edges of said vane portion, said edge fold being joined to said second edge flange whereby the impeller blade is structurally reinforced; said turbine element comprising a generally radially extending turbine body portion, a rim flange thereon extending axially beyond the outer ends of said impeller blades, and a plurality of turbine blades; each turbine blade being formed of sheet metal and comprising a bucket portion secured to said rim flange, a fluid return portion secured to said turbine body portion extending radially inward from said bucket portion, an edge flange on the bucket and fluid return portions for attachment of the turbine blade to the turbine body portion, a rearwardly directed edge fold formed along the free edge of said bucket, and an edge flange formed along the inwardly extending free edge of the fluid return directed rearwardly at right angles thereto, said edge fold of the bucket and said edge flange being joined for structural reinforcement of the turbine blade and to provide a continuous channel for fluid flow from said bucket radially inward to the locus of said fluid shirting vane portions.

12. A rotary fluid coupling as described in claim 11 wherein the outer portion of each said impeller blade is curved forwardly in the direction of rotation.

13. A rotary fluid coupling as described in claim 11 wherein the free edge of each impeller blade outward of said vane and the corresponding free edge of each turbine blade are provided with complementary sinuous edge formations.

14. A rotary fluid coupling as described in claim 11 wherein: the bucket portion of each turbine blade and the outer edge of each impeller blade are disposed obliquely to the axis of rotation; the inner and outer ends of the edge of each impeller blade which is secured to the said projector body portion are curved toward the turbine element; and the impeller body has inner and outer circumferential formations shaped to correspond to the shape of the impeller blades.

15. A rotary fluid coupling as described in claim 11 wherein the said bucket portion of each turbine blade is disposed parallel to the axis of rotation.

16. A rotary fluid coupling as described in claim 11 wherein the said bucket portion of each turbine blade is disposed parallel to the axis of rotation, and wherein the said rim flange of the turbine element is provided with a circumferential flange extending inwardly and closing the spaces between the ends of adjacent turbine buckets.

17. A rotary fluid coupling device comprising a turbine element having a disk body portion with an axially extending rim flange, a plurality of turbine blades, each having a bucket portion and a radial fluid return portion affixed respectively to said rim flange and body portion; a rotary fluid impeller element having a disk body portion and a plurality of impeller blades affixed thereon, said impeller element being disposed within said turbine element, and each said impeller blade having at its inner end a fluid shifting vane portion extending laterally and disposed inward of the end of the fluid return portion of an adjacent turbine blade; said impeller and turbine blades having complementary free edge shapes, the free edges thereof being flanged for structural strength and to provide a radial outward and inward flow channel between adjacent impeller blades and turbine blades respectively.

18. For a fluid operated transmission including a motor driven rotary turbine type fluid coupling having a coupling output shaft, a hydraulically operated clutch unit between the said coupling output shaft and the transmission input shaft, a transmission housing providing a fluid sump, and a pump within said housing drawing fluid from said sump: a transmission control system comprising first fluid conduit means from the outlet of said pump opening through said coupling output shaft to supply fluid to the interior of said coupling; second fluid conduit means from the outlet of said pump opening through said coupling output shaft to said hydraulically operated clutch unit to supply fluid pressure for engaging said clutch; spring closed clutch exhaust relief and pump outlet relief valves opening to said sump; a solenoidally operated rotary valve normally biased to closed position provided with portion and channel systems adapted when the rotary valve is in closed position to connect the pump outlet to the pump outlet relief valve and the second conduit means to the clutch relief valve, and adapted when in open position to connect the pump outlet to said second conduit means and to block the pump outlet from said pump outlet relief valve; motor control means including a switch closed when said motor control means is set for a motor speed above a chosen idling speed; and a valve solenoid actuating circuit including said switch and the solenoid of said valve, whereby said rotary valve is moved to open position permitting said pump to apply fluid pressure to said coupling and to said clutch when the motor control means is above said idling speed setting and biased to said closed position to release fluid pressure from said clutch and from said pump outlet when said motor control means is at idling speed setting.

*19. A rotary fluid coupling adapted for use with a prime mover and comprising a driven shaft, a first fluid impeller element, a first turbine element, a second fluid impeller element and a corresponding second turbine element, said driven shaft being co-axial with said prime mover, a second driven shaft co-axial with said first driven shaft, the first said driven shaft comprising a sleeve shaft mounted upon said second driven shaft for relative rotation therewith, said first fluid impeller element mounted for rotational movement by said prime mover, said first turbine element and said second fluid impeller element being mounted for rotational movement by said sleeve shaft, said second turbine element being mounted on said second driven shaft for rotational movement therewith, said first impeller driving said first turbine and said second impeller driving said second turbine whereby said driven shaft is driven by said prime mover through said fluid coupling.*

*20. A rotary fluid coupling adapted to be interposed between a prime mover and a driven shaft, said coupling comprising a first fluid impeller element, a first turbine element, a second fluid impeller element and a corresponding second turbine element, said driven shaft being co-axial with said prime mover, a second driven shaft co-axial with said prime mover, the first said driven shaft comprising a sleeve shaft mounted upon said second driven shaft for relative rotation thereto, means mounting said first fluid impeller element for rotational movement by said prime mover, said first turbine element and said second fluid impeller element being mounted for rotational movement with said sleeve shaft, said second turbine element being mounted on said second shaft for rotational movement therewith.*

*21. A rotary fluid coupling adapted for use with a prime mover and a driven shaft, said coupling comprising a first fluid impeller element, a first turbine element, a second fluid impeller element and a corresponding second turbine element, said driven shaft being co-axial with said rotary fluid coupling, a second driven shaft, the first said driven shaft comprising a sleeve shaft mounted upon said second driven shaft for relative rotation therewith, said first fluid impeller element mounted to said prime mover for rotational movement by said prime mover, said first turbine element and said second fluid impeller element being mounted upon said sleeve shaft for rotational movement with said sleeve shaft, said second turbine element being mounted on said second driven shaft for rotational movement therewith.*

*22. A mechanism combining a pair of rotary fluid couplings, each said coupling comprising a fluid impeller element and a fluid turbine element, said mechanism comprising a main shaft, a sleeve shaft mounted co-*

*axially upon said main shaft, said sleeve shaft comprising elements of a first said fluid coupling and elements of a second fluid coupling for relative rotational movement, a prime mover, means for mounting a first fluid impeller element for rotational movement by said prime mover, a first fluid turbine element and a second fluid impeller element being mounted upon said sleeve shaft for rotational movement by said sleeve shaft, a second fluid turbine element being mounted upon said main shaft for rotational movement therewith.*

*23. A rotary fluid coupling for transmitting torque through a fluid medium comprising a prime mover, a driven shaft co-axial with said prime mover, a sleeve shaft freely rotatable upon said driven shaft, a first impeller mounted for rotational movement by said prime mover, a first turbine and a second impeller unitarily mounted upon said sleeve shaft to rotate therewith whereby said first impeller drives said first turbine, and a second turbine mounted upon said driven shaft to rotate therewith whereby said second impeller drives said second turbine.*

*24. A rotary fluid coupling comprising a prime mover, a driven shaft coaxial with said prime mover and rotatable relative thereto, a sleeve shaft freely rotatable upon said driven shaft, a casing mounted to rotate with said prime mover, a first impeller mounted to an end wall of said casing, a first turbine and a second impeller mounted upon said sleeve shaft to rotate therewith whereby said first impeller drives said first turbine, and a second turbine mounted upon said driven shaft to rotate therewith whereby said second impeller drives said second turbine.*

*25. A rotary fluid type coupling comprising a flywheel mounted upon a prime mover to rotate therewith, a driven shaft coaxial with said flywheel and rotatable relative thereto, a sleeve shaft rotatably mounted upon said driven shaft, a first impeller secured to said flywheel to rotate therewith, a first turbine and a second impeller mounted upon said sleeve shaft to rotate therewith, said first turbine being adjacent said first impeller whereby said first impeller drives said first turbine, a second turbine mounted upon said driven shaft to rotate therewith, said second turbine being adjacent said second impeller whereby said second impeller drives said second turbine.*

*26. A rotary fluid coupling comprising a prime mover a driven shaft coaxial with said prime mover and rotatable relative thereto, said driven shaft having a radially projecting, circumferentially continuous flange intermediate the ends thereof, a sleeve shaft interposed between the flange of said driven shaft and said prime mover, said sleeve shaft freely rotatable upon said driven shaft, said sleeve shaft having a radially projecting, circumferentially continuous flange, a first impeller mounted to said prime mover and adapted to be rotated thereby, a first turbine and a second impeller unitarily secured to said flange on said sleeve shaft whereby said first turbine is adjacent said first impeller to be driven by said first impeller, a second turbine secured to said flange on said driven shaft, said second turbine being adjacent said second impeller whereby said second impeller drives said second turbine.*

*27. A rotary fluid coupling comprising a prime mover, a driven shaft coaxial with said prime mover and rotatable relative thereto, said driven shaft having a radially projecting, circumferentially continuous flange, a sleeve shaft freely rotatable upon said driven shaft and interposed between said flange of said driven shaft and said prime mover, said sleeve shaft having a radially projecting, circumferentially continuous flange, a casing mounted at one end thereof to rotate with said prime mover and having an opposite end thereof mounted to rotate freely upon said driven shaft beyond said flange of said driven shaft, a first impeller mounted to an end wall of said casing, a first turbine and a second impeller unitarily mounted to said flange of said sleeve shaft to rotate therewith, said first turbine being adjacent said first impeller whereby said first impeller drives said first turbine, a second turbine secured to said flange on said driven shaft to rotate therewith, said second turbine being adjacent said second impeller whereby said second impeller drives said second turbine.*

*28. A rotary fluid coupling comprising a fly-wheel mounted to a prime mover for rotation by said prime mover, a driven shaft coaxial with said fly-wheel and rotatable relative thereto, said driven shaft having a radially projecting, circumferentially continuous flange, a sleeve-shaft rotatably mounted upon said driven shaft, said sleeve shaft being axially interposed between said flange of said driven shaft and said fly-wheel, said sleeve shaft having a radially projecting circumferentially continuous flange, a first impeller mounted to rotate with said fly-wheel, a first turbine and a second impeller unitarily mounted upon said sleeve shaft at the flange thereof and adapted to rotate therewith, said first turbine being adjacent said first impeller whereby said first impeller drives said first turbine, a second turbine mounted upon said flange of said driven shaft to rotate therewith, said second turbine being adjacent said second impeller whereby said second impeller drives said second turbine.*

*29. A mechanism combining a pair of rotary fluid couplings, each said coupling comprising a fluid impeller element and a fluid turbine element, said mechanism comprising a main shaft, a sleeve shaft mounted co-axially upon said main shaft, said sleeve shaft comprising elements of a first fluid coupling and elements of a second fluid coupling for relative rotational movement, a prime mover, means for mounting a first fluid impeller for rotational movement by said prime mover, a first fluid turbine element being mounted upon said sleeve shaft for rotational movement by said sleeve shaft, said second fluid impeller element rotated by movement of said sleeve shaft, a second fluid turbine element being mounted upon said main shaft for rotational movement therewith.*

*30. A rotary fluid coupling comprising a casing coaxially mounted to rotate with a drive shaft, a driven shaft coaxial with said drive shaft and projecting into said casing, a sleeve shaft rotatably mounted upon said driven shaft within said casing, a first impeller mounted to an end wall of said casing to rotate therewith, a second turbine mounted to said driven shaft within said casing to rotate therewith, said sleeve shaft axially interposed between said impeller and said turbine, a second impeller and a first turbine unitarily mounted to said sleeve shaft to rotate therewith, said first impeller driving said first turbine and said second impeller driving said second turbine whereby said driven shaft is indirectly driven by said drive shaft.*

References Cited in the file of this patent or the original patent

UNITED STATES PATENTS

| | | |
|---|---|---|
| 1,991,094 | Higley | Feb. 12, 1935 |
| 2,151,075 | Berger | Mar. 21, 1939 |
| 2,189,537 | Swennes | Feb. 6, 1940 |
| 2,301,957 | Lang | Nov. 17, 1942 |
| 2,351,483 | Carnagua | June 13, 1944 |
| 2,393,859 | Jandasek | Jan. 29, 1946 |
| 2,407,289 | La Brie | Sept. 10, 1946 |
| 2,466,616 | Shults | Apr. 5, 1949 |
| 2,519,022 | Burtnett | Aug. 15, 1950 |
| 2,529,929 | Foster | Nov. 14, 1950 |
| 2,569,087 | Alexandrescu | Sept. 25, 1951 |